United States Patent
Yamanaka

(10) Patent No.: US 6,549,982 B1
(45) Date of Patent: Apr. 15, 2003

(54) BUFFER CACHING METHOD AND APPARATUS FOR THE SAME IN WHICH BUFFER WITH SUITABLE SIZE IS USED

(75) Inventor: Wataru Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/516,167

(22) Filed: Feb. 29, 2000

(30) Foreign Application Priority Data

Mar. 5, 1999 (JP) .......................................... 11-057959

(51) Int. Cl.⁷ ............................................. G06F 12/00
(52) U.S. Cl. ................................ 711/118; 711/1; 711/3; 711/4; 711/113; 711/133; 711/146
(58) Field of Search .................................. 711/118, 133, 711/1, 3, 4, 113, 146

(56) References Cited

U.S. PATENT DOCUMENTS

| | | | |
|---|---|---|---|
| 5,758,149 A | * 5/1998 | Bierma et al. .................. | 707/8 |
| 5,778,430 A | 7/1998 | Ish et al. ..................... | 711/133 |

FOREIGN PATENT DOCUMENTS

| | | |
|---|---|---|
| JP | 2-39343 | 2/1990 |
| JP | 5-158792 | 6/1993 |
| JP | 7-210365 | 8/1995 |
| JP | 7-311710 | 11/1995 |
| JP | 10-69429 | 3/1998 |

OTHER PUBLICATIONS

Andrew S. Tanenbaum, "Moderne Betriebssysteme", Hanser Verlag, 1994, pp. 102–105.

* cited by examiner

Primary Examiner—Reginald G. Bragdon
Assistant Examiner—Mehdi Namazi
(74) Attorney, Agent, or Firm—Sughrue Mion, PLLC

(57) ABSTRACT

A buffer cache apparatus includes a storage unit storing data, a buffer cache and a control unit. The buffer cache stores a balanced tree and free lists. Data containing buffers are hierarchically provided as nodes in the balanced tree, and the free lists are respectively provided for different sizes. Each of the free lists includes at least one free buffer when the at least one free buffer exists. The control unit is responsive to a data request. The control unit searches the free lists for a desired buffer based on a size of a requested data requested by the data request, when the requested data does not exist in the balanced tree. Also, the control unit adds the desired buffer to the balanced tree to store the requested data from the storage unit into the desired buffer. The desired buffer has a size larger than the requested data size and as small as possible.

31 Claims, 14 Drawing Sheets

BUFFER CACHING METHOD AND APPARATUS FOR THE SAME IN WHICH BUFFER WITH SUITABLE SIZE IS USED

BACKGROUND OF THE INVENTION

1. Field of the Invention

The present invention relates to a file system, and more particularly to a buffer cache control method and an apparatus for the same.

2. Description of the Related Art

A switching system is provided with a communication channel unit 12 to control a telephone line between telephone subscribers 10, as shown in FIG. 1. A communication routing unit 12 is controlled by a central processing unit 14 such as a computer. That is, a central control unit 16 reads a program from a main storage unit 18 and an auxiliary storage unit 20 and interprets and executes each of commands of the program. Thus, a necessary instruction and data are sent to a communication routing unit 12 so that all functions such as a charging function and a call processing function are controlled.

Also, a maintenance and operation unit (console) 22 exchanges data with the central control unit 16.

In such a switching system, various type files are used. In a conventional switching system, caching is carried out using a buffer cache with a predetermined block size. Referring to FIG. 2, a general file operation in the conventional switching system will be described. It is supposed that there is a file aaa on a magnetic disk unit 18 as the main storage unit. The file aaa is divided on the magnetic disk in units of blocks. The file aaa is stored in blocks 100, 101, 102, 205, 206, 255, 256 and 300. When the file size is extended, a new block is connected to the last block. When the new block cannot be connected to the last block, the block is provided at another place. For example, if a block 301 next to the block 300 is used for the new block. If the block 301 is already used, a released block is used for the new block.

By the way, it is not possible to read the whole file aaa in the buffer cache, because the occupied memory area is large. Therefore, only the contents of blocks containing a necessary portion of data are read in the buffer cache. For example, when there is the necessary data portion in the blocks 101, 102 and 205 of the file aaa composed of the blocks 100, 101, 102, 205, 206, 255, 256 and 300, the data in the blocks 101, 102 and 205 are read in the buffer cache. Also, when there is the necessary data portion in the block 102 of the file aaa, only the block 102 is read in the buffer cache.

In a buffer caching method using the buffer cache with a predetermined block size, it is possible to speed up the read operation if the block size of the file is smaller than the size of the buffer cache. However, when some blocks are continuously accessed as in a file system of a switching apparatus, the read access operation is divided into a plurality of I/O processes. For this reason, the enough effect is not attained.

In the technique described in Japanese Laid Open Patent Application (JP-A-Heisei 5-158792), an input/output buffer is provided, and when the access size is large, the data is once taken into an input/output buffer. Then, data is divided and is supplied to the buffer cache.

Also, in a method of caching using the buffer cache with a predetermined block size, access of a predetermined data length is carried out with no relation to the block size of the file. Therefore, when the block size of the buffer cache is large, the wasteful use of the block had occurred when a small file is manipulated.

It is proposed to make the block size of the buffer cache variable to cope with such a problem. For example, the technique is disclosed in Japanese Laid Open Patent Application (JP-A-Heisei 10-69429), in which a buffer memory area on a memory is allocated in accordance with the request of an application program. However, this method using the buffer cache of the variable length is for a communication control program in which many data with predetermined sizes are manipulated. In the file system of the switching apparatus, the method is not suitable because required data have various sizes.

Also, a method of controlling a buffer cache using a hash list is disclosed in Japanese Laid Open Patent Application (JP-A-Heisei 7-311710). However, it is not advantageous in high speed access to apply the hash list to the buffer cache with a variable length.

In the file system of the switching apparatus, because a data area with a large size is required, the above conventional examples are not suitable in the viewpoint to realize high-speed access. For this reason, the method using the buffer cache with a predetermined block size is still carried out for the caching. In such a way, it is not possible to attain high speed access.

In conjunction with the above description, Japanese Laid Open Patent Application (JP-A-Heisei 2-39343) discloses a transmission and reception buffer control system for data transfer between a host computer and a display. A buffer is provided with a data storage area of variable length, a head pointer storage area for storing a pointer of a head address of the data storage area and a tail pointer storage area for storing a pointer of a tail address of the data storage area.

Also, an image forming apparatus such as a laser printer an a facsimile is disclosed in Japanese Laid Open Patent Application (JP-A-Heisei 7-210365). In this reference, it is detected using a timer that a reception buffer is full. If the buffer is still full after a predetermined time, the buffer size is increased.

SUMMARY OF THE INVENTION

Therefore, an object of the present invention is to provide a buffer caching method in which a buffer cache can be made variable in size, and a buffer caching apparatus for the same.

Another object of the present invention is to provide a buffer caching method in which files with various sizes can be accessed at high speed, and a cache buffer apparatus for the same.

Still another object of the present invention is to provide a buffer cache method in which buffers can be released or inserted based on the data size of requested data, and a cache buffer apparatus for the same.

Yet still another object of the present invention is to provide a buffer cache method in which buffers with various sizes are previously provided such that one of the buffers is selected, and a cache buffer apparatus for the same.

It is also an object of the present invention to provide a buffer cache method in which a balanced tree is used, and a cache buffer apparatus for the same.

Another object of the present invention is to provide a buffer caching method in which unbalance of a balanced tree can be corrected, and a cache buffer apparatus for the same.

In order to achieve an aspect of the present invention, a buffer cache apparatus includes a storage unit storing data, a buffer cache and a control unit. The buffer cache stores a balanced tree and free lists. Data containing buffers are hierarchically provided as nodes in the balanced tree, and the free lists are respectively provided for different sizes. Each of the free lists includes at least one free buffer when the at least one free buffer exists. The control unit is responsive to a data request. The control unit searches the free lists for a desired buffer based on a size of a requested data requested by the data request, when the requested data does not exist in the balanced tree. Also, the control unit adds the desired buffer to the balanced tree to store the requested data from the storage unit into the desired buffer. The desired buffer has a size larger than the requested data size and as small as possible.

Here, each of the free lists comprises a head section indicating the size and the at least one free buffer connected to the head section, when the at least one free buffer exists. The control unit: (a) searches the head sections of the free lists based on the requested data size to find one of the free lists which is provided for the smallest one of the sizes larger than or equal to the requested data size, (b) determines whether the found free list contains the at least one free buffer, (c) sets another of the free lists for the next smallest size as the found free list, when it is determined that the found free list does not contain the at least one free buffer, and (d) sets as the desired buffer, a free buffer contained in the found free list when it is determined that the found free list contains the at least one free buffer, from the searching operation or repetition of the setting operation.

Also, the control unit releases and deletes one of the data containing buffers from the balanced tree, when at least a part of the requested data exists in the data containing buffer of the balanced tree. Also, the control unit searches the free lists for the desired buffer based on the requested data size. In this case, the control unit adds the deleted data containing buffer as the free buffer to one of the free lists based on a size of the deleted data containing buffer. Also, the control unit searches the desired buffer from the free lists based on the requested data size, the sizes for the free lists, and whether the at least one free buffer is connected to each of the free lists.

Also, the control unit releases and deletes ones of the data containing buffers from the balanced tree, when at least a part of the requested data exists in the data containing buffers of the balanced tree. Also, the control unit searches the free lists for the desired buffer based on the requested data size. In this case, the control unit adds the deleted data containing buffers as the free buffers to the free lists based on a size of each of the deleted data containing buffers. Also, in this case, the control unit searches the desired buffer from the free lists based on the requested data size, the sizes for the free lists, and whether the at least one free buffer is connected to each of the free lists.

Also, the control unit corrects the balanced tree such that depths from a root node to leaf nodes in the nodes of the balanced tree are as uniform as possible. Also, the control unit carries out the correcting operation at a predetermined time or an idle time of the control unit. In addition, the buffer cache apparatus is applied to a switching apparatus.

In order to achieve another aspect of the present invention, a buffer caching method is attained by determining whether a request data specified by a data request exists in a balanced tree, buffers are hierarchically provided as nodes in the balanced tree, by searching a desired buffer from free buffers with different sizes based on a size of the requested data when it is determined that the requested data does not exist in the balanced tree, the desired buffer has a size larger than the requested data size and as small as possible, by adding the desired buffer to the balanced tree, and then by storing the requested data from the storage unit into the desired buffer.

In the searching, (a) one of the free lists found based on the requested data size, wherein the found free list is provided for the smallest one of the sizes larger than or equal to the requested data size, (b) it is determined whether the found free list contains the at least one free buffer, (c) another of the free lists is set for the next smallest size as the found free list, when it is determined that the found free list does not contain the at least one free buffer, and (d) setting as the desired buffer, a free buffer contained in the found free list, when it is determined that the found free list contains the at least one free buffer, after the finding operation (a) or repetition of the setting operation (c).

Also, the buffer caching method may further include releasing and deleting one of the data containing buffer from the balanced tree, when the requested data exists in the data containing buffer of the balanced tree; and searching the free lists for the desired buffer based on the requested data size. In this case, the method may further include adding the deleted data containing buffer as the free buffer to one of the free lists based on a size of the deleted data containing buffer. Also, the method may further include searching the desired buffer from the free lists based on the requested data size, the sizes for the free lists, and whether the at least one free buffer is connected to each of the free lists.

Also, the method may further include releasing and deleting data containing buffers from the balanced tree, when the requested data exists in the data containing buffers of the balanced tree; and searching the free lists for the desired buffer based on the requested data size. In this case, the method may further include adding the deleted data containing buffers as the free buffers to the free lists based on a size of each of the deleted data containing buffers. Also, the method may further include searching the desired buffer from the free lists based on the requested data size, the sizes for the free lists, and whether the at least one free buffer is connected to each of the free lists.

Also, the method may further include correcting the balanced tree such that depths from a root node to leaf nodes in the nodes of the balanced tree are as uniform as possible. In this case, the correcting operation is carried out at a predetermined time or an idle time of the control unit.

In order to achieve still another aspect of the present invention, a recording medium storing a program for a buffer caching method. The method is attained by determining whether a request data specified by a data request exists in a balanced tree, buffers are hierarchically provided as nodes in the balanced tree, by searching a desired buffer from free buffers with different sizes based on a size of the requested data when it is determined that the requested data does not exist in the balanced tree, the desired buffer has a size larger than the requested data size and as small as possible, by adding the desired buffer to the balanced tree, and then by storing the requested data from the storage unit into the desired buffer.

DESCRIPTION OF THE PREFERRED EMBODIMENTS

Hereinafter, a switching apparatus to which a buffer cache apparatus of the present invention is applied will be described below in detail with reference to the attached drawings.

Figure 1:
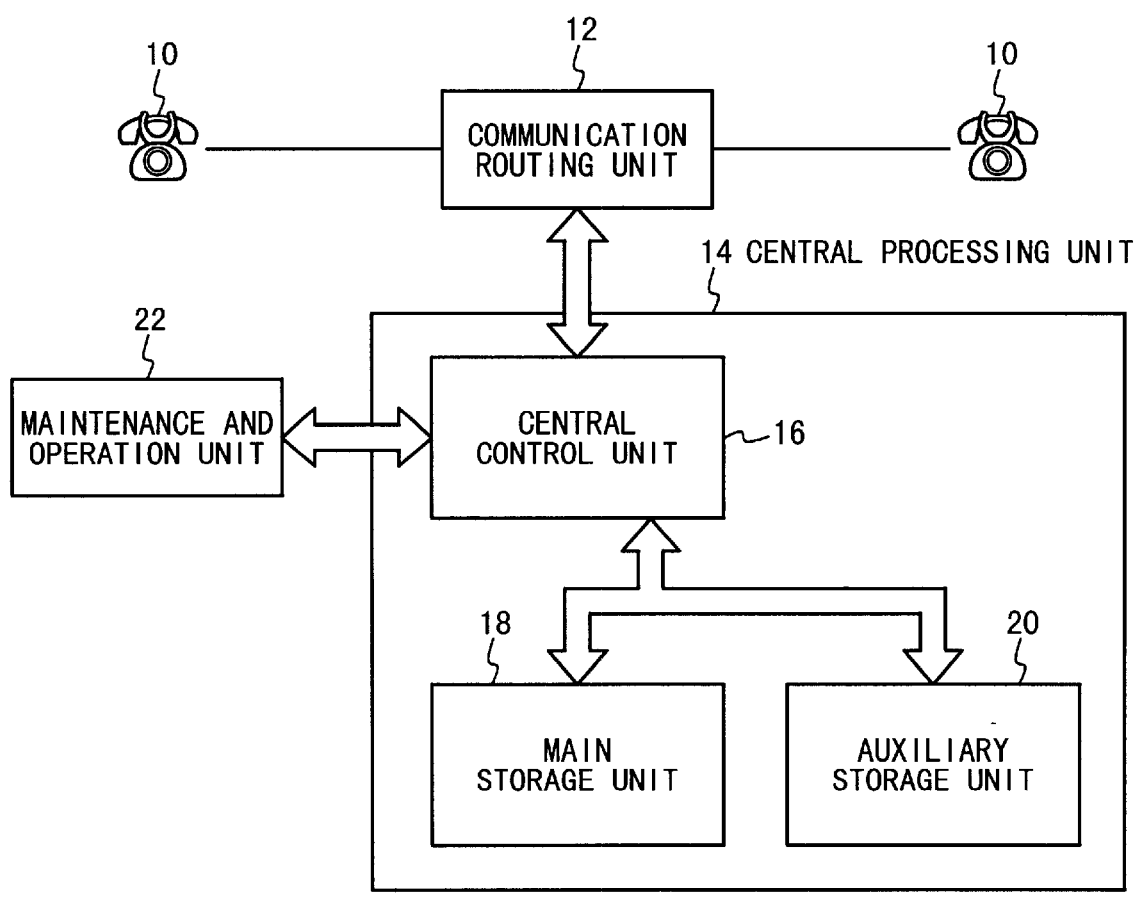
FIG. 1 is a block diagram showing the basic structure of a conventional switching apparatus.
Figure 2:
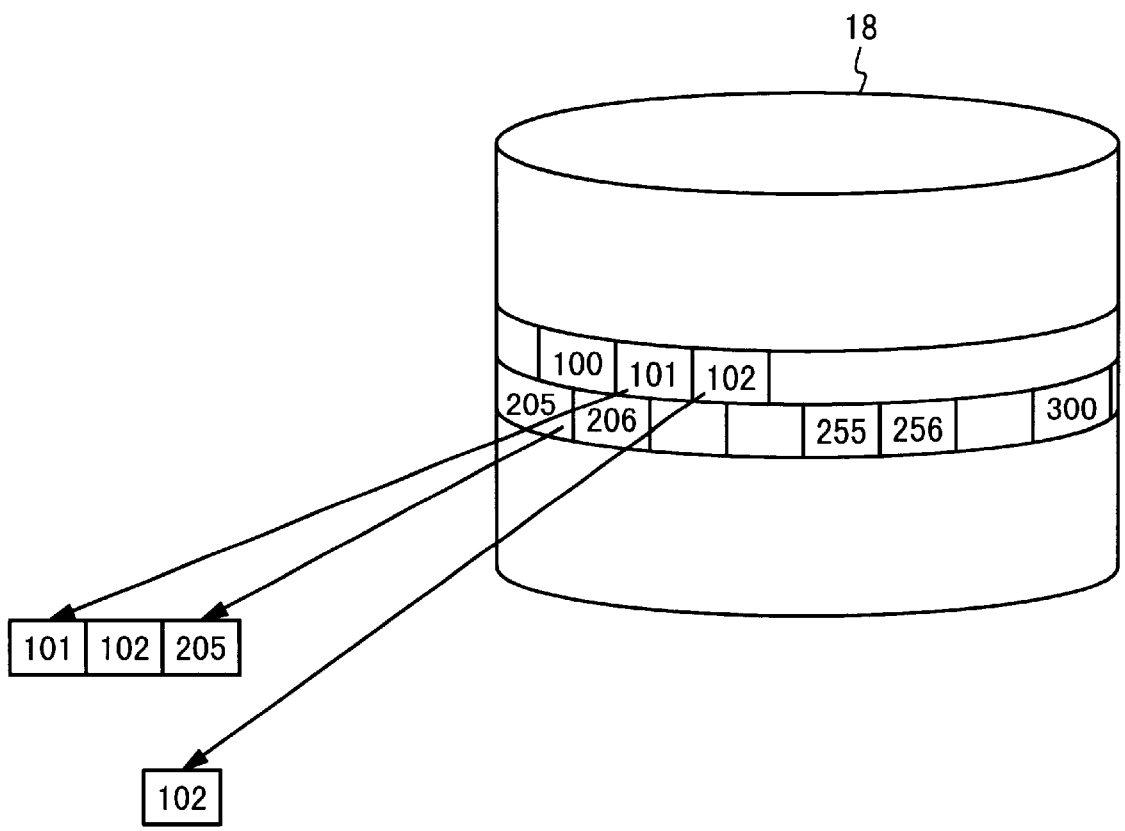
FIG. 2 is a diagram to explain a general file operation carried out by the conventional switching apparatus.
Figure 3:
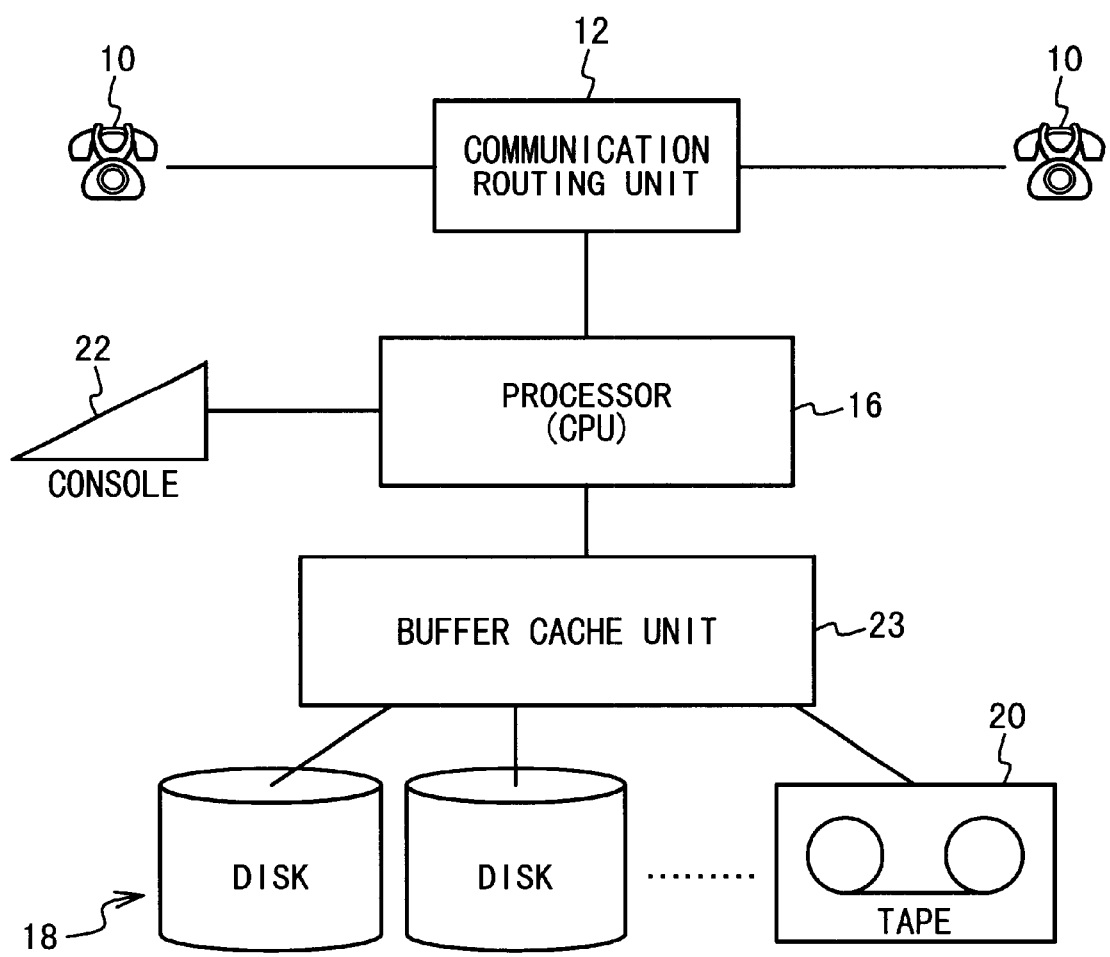
FIG. 3 is a diagram showing the basic structure of a switching apparatus to which a buffer caching method of the present invention is applied.

FIG. 3 shows the basic structure of the switching apparatus to which the present invention is applied. Referring to FIG. 3, switching system is composed of a communication routing unit 12, a processor (CPU) 16, a buffer cache apparatus 23 including a buffer cache unit, and magnetic disk units 18 as a main storage unit and a magnetic tape unit 20 as an auxiliary storage unit 20. The communication routing unit 12 controls a telephone line between telephone subscribers 10, as shown in FIG. 3. The processor (CPU) controls the communication routing unit 12. That is, the processor 16 reads a program from the magnetic disk unit 18 as the main storage unit or an auxiliary storage unit 20 and interprets and executes each of commands of the program. Thus, necessary instructions and data are sent to the communication routing unit 12 so that all functions such as a charging function and a call processing function are managed. Also, a console 22 exchanges data with the processor 16. A program for the buffer caching method of the present invention runs on the buffer cache apparatus 23.

Figure 4:
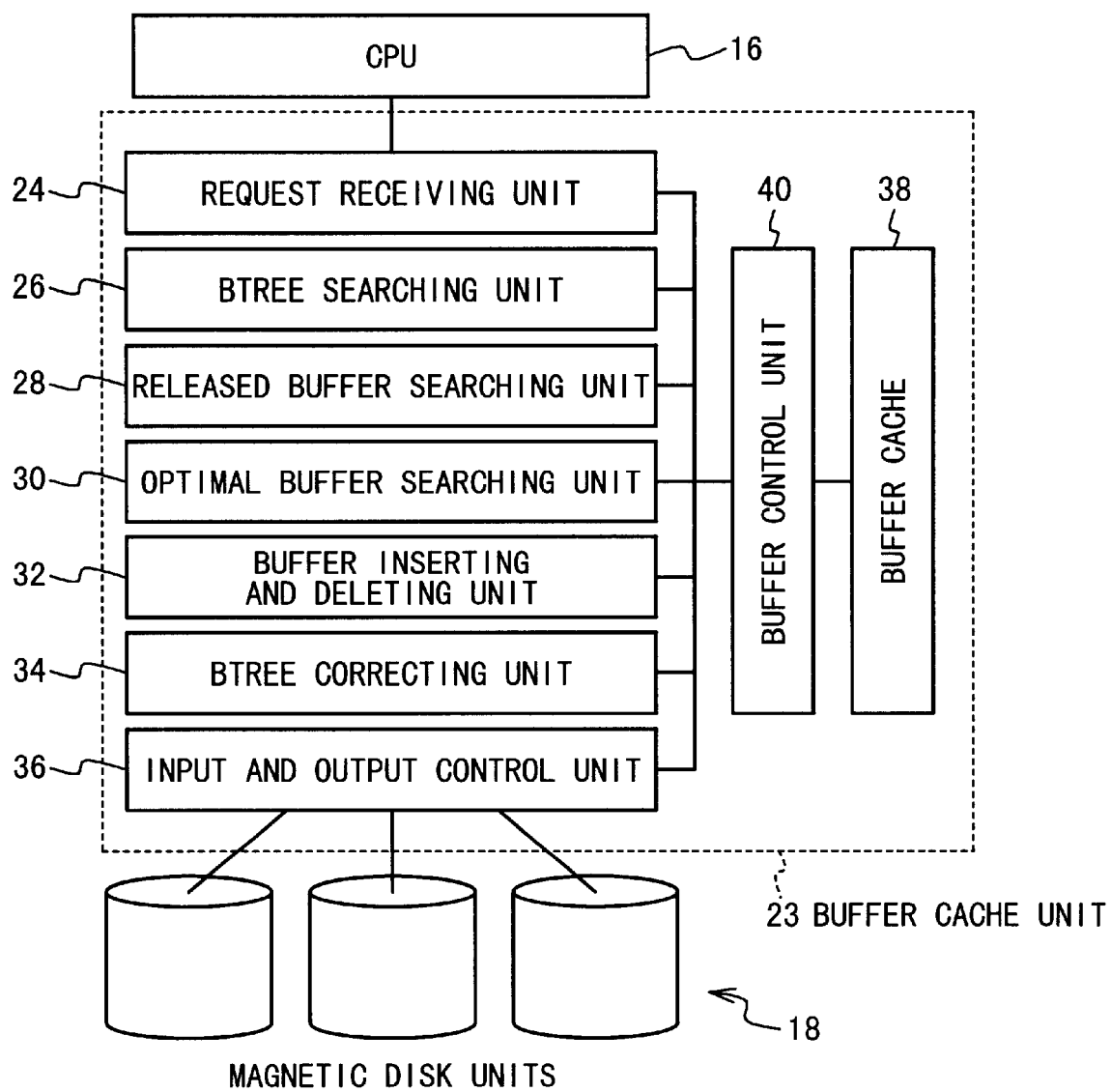
FIG. 4 is a functional block diagram showing a buffer cache apparatus according to a first embodiment of the present invention.

FIG. 4 is a functional block diagram of the buffer cache apparatus 23 according to the first embodiment of the present invention. Referring to FIG. 4, the buffer cache apparatus 23 is functionally composed of a request receiving unit 24, a balanced tree (Btree) searching unit 26, a released buffer searching unit 28, an optimal buffer searching unit 30, a buffer inserting and deleting unit 32, a balanced tree correcting unit 34, an input and output control unit 36, a buffer cache 38 and a buffer control unit 40.

The request receiving unit 24 receives a buffer acquiring request and the balanced tree correcting request. The balanced tree searching unit 26 searching the balanced tree. The released buffer searching unit 28 searches free lists for a released buffer. The optimal buffer searching unit 30 searches an optimal size in case of the search of the free lists. The buffer inserting and deleting unit 32 inserts and deletes a buffer into and from the balanced tree. The balanced tree correcting unit 34 adjusts the balance of the balanced tree. The input and output control unit 36 controls input/output from and to the magnetic disks 18. The buffer cache 38 includes the balanced tree and the free lists. The buffer control unit 40 controls access to the buffer cache 38.

Hereinafter, the buffer cache apparatus of the present invention will be described with reference to FIGS. 5 and 6.

Figure 5:
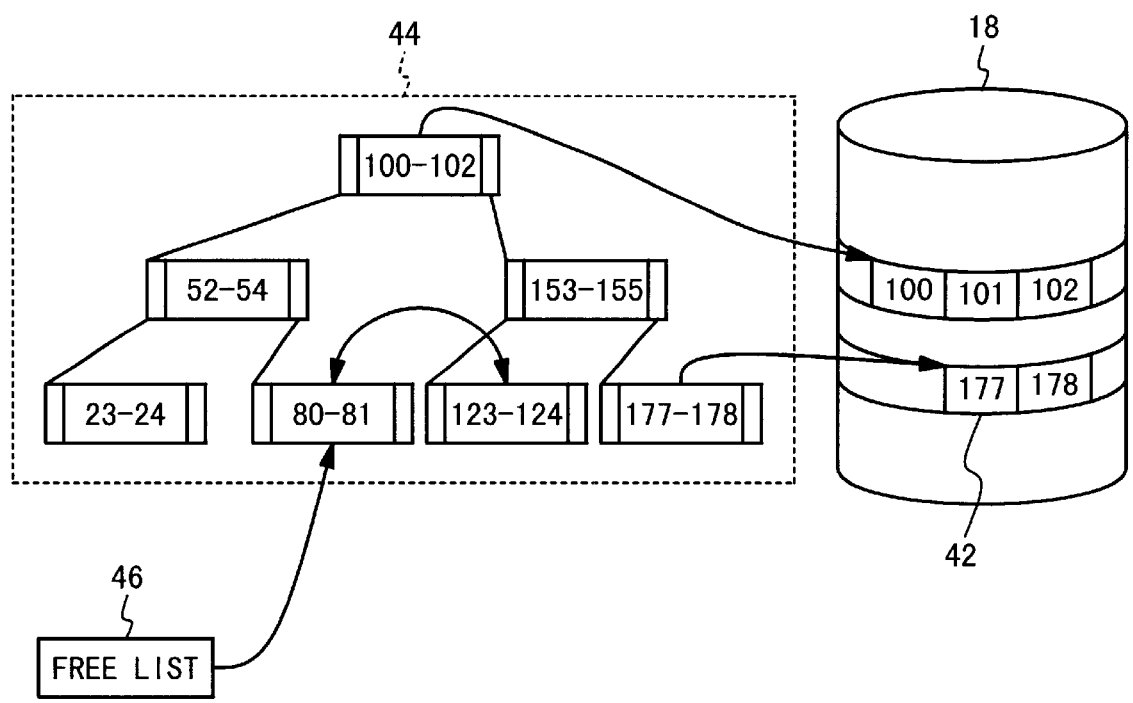
FIG. 5 is a diagram showing the balanced tree in a buffer cache.

FIG. 5 is a diagram showing the balanced tree in the buffer cache 38 and blocks 100 to 178 of the magnetic disk 18. In FIG. 5, the number of the buffer in each node of the balanced tree 44 indicates the numbers of the blocks to be held. FIG. 5 shows that each buffer is composed of buffer blocks with the variable lengths such as 2 blocks or 3 blocks. As shown in FIG. 5, the buffer cache 38 includes the balanced tree (balanced tree) 44 for the buffer search and free lists 46 of released buffers with a plurality of sizes. Each of nodes of the balanced tree 44 holds one buffer with a variable length.

The balanced tree 44 is a two-branched search Binary tree. A buffer with the number smaller than the number of the buffer in the node is held in the left side branch in the lower layer. A buffer with number larger than the number of the buffer in the node is held in the right side branch in the lower layer. Each buffer has two pointers for indicating the left side buffer and the right side buffer. In this way, the searching operation through the balanced tree is started from the root node. A target buffer is compared with the node buffer in number to determine that the target buffer is in which of two branches. Thus, the searching operation is carried out by repeating the determination. In this way, the buffer of each node on the balanced tree 44 is possible to hold effective data, and to collectively hold one or more continued data blocks.

Figure 6:
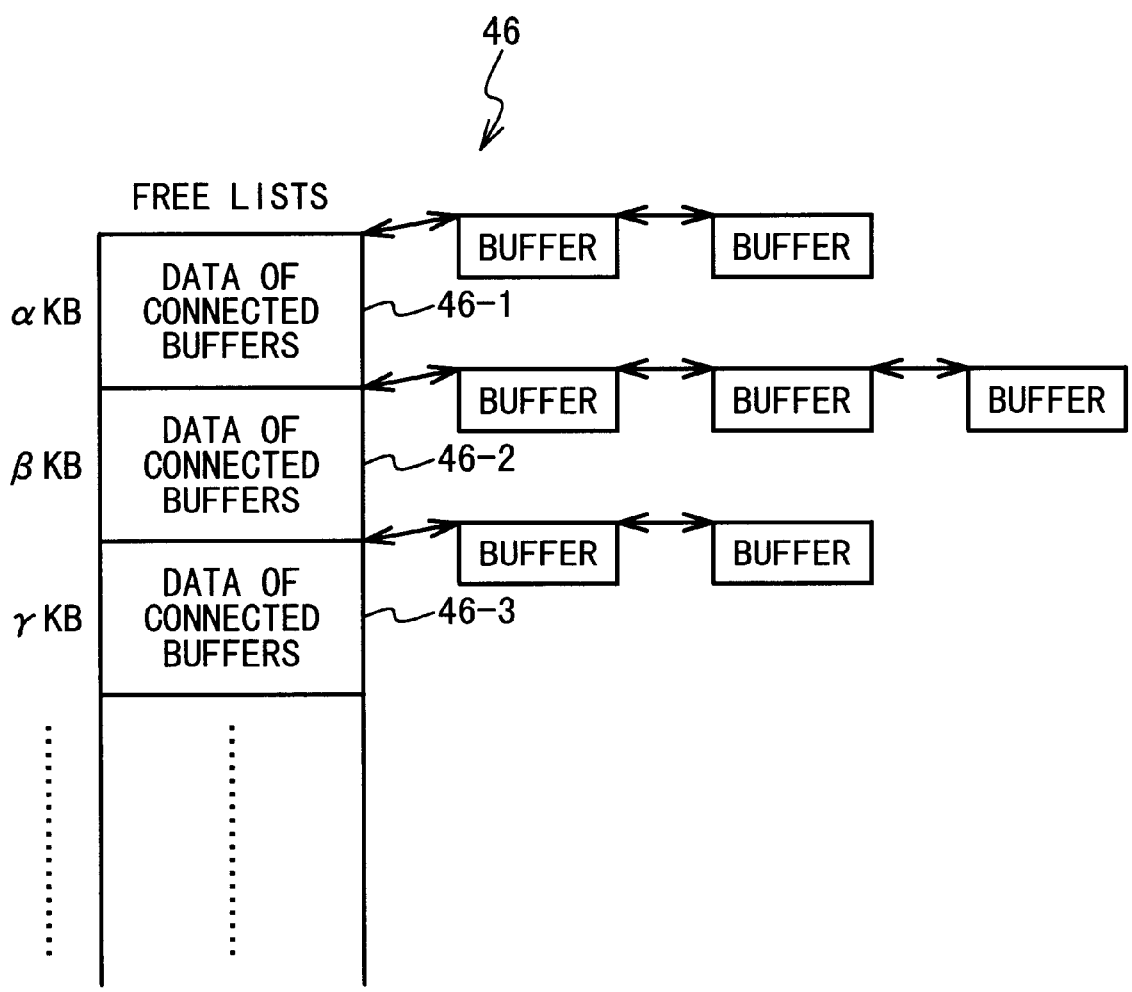
FIG. 6 is a diagram showing the structure of free lists used in the buffer cache apparatus according to the first embodiment of the present invention.

FIG. 6 shows the structure of the free lists 46. The free lists 46 are provided for different buffer sizes, respectively. The free list 46-1 is a list of buffers with the size of α kilobytes (kB). The free list 46-2 is a list of buffers with the size of β kilobytes. A released buffer with one or more blocks is connected with one of the free lists A at the right end. In the insertion of the buffer into the balanced tree, the buffer at the left end is released from the free list and is used. The remaining buffers are connected to a head section for data of connected buffers.

When a file on the magnetic disk 18 is accessed, the balanced tree 44 is first searched to determine whether or not the requested data is exists on the balanced tree 44. When the requested data is not found, a buffer is found in the free lists 46 to satisfy the size of the requested data. At this time, the found buffer has the size larger than the size of the request data and the nearest size to the size of the request data. Then, the requested data is stored in the found buffer from the file. A head address and last address of the used blocks are stored in the buffer on the balanced tree 44. In this way, both of the lossless buffer control and high-speed file access can be made possible.

Next, the buffer state of the balanced tree will be described below. The operation has three cases.

Case 1: It is not necessary to leave data in the buffer on the balanced tree, when a system is started and a file is deleted. Therefore, the effective data is not in the buffer in the release condition and the buffer is merely connected with one of the free lists.

Case 2: There is a case where data in the buffer on the balanced tree is being used by a program. For example, the data in the buffer is being used in a copying operation. In this case, the buffer is merely connected with the balanced tree because effective data being used is in the buffer.

Case 3: There is a case where data in the buffer on the balanced tree is not used by the program. For example, it is a case that the effective data is in the buffer in the case other than the above cases 1 and 2. In this case, because the effective data is in the buffer on the balanced tree in the release condition, the buffer is connected with the balanced tree and the free list.

Next, the operation of the buffer cache apparatus according to the first embodiment of the present invention will be described in detail with reference to the flow charts of FIGS. 7 to 10.

There are four operation patterns in the buffer cache. The first operation pattern is a case where the requested data exists in the buffer on the balanced tree just as it is. The second operation pattern is a case where the requested data does not exist on the balanced tree. The third operation pattern is a case where a part of the requested data exists in one of the buffers on the balanced tree. The fourth operation pattern is a case where the requested data exists in the plurality of buffers on the balanced tree.

Figure 7:
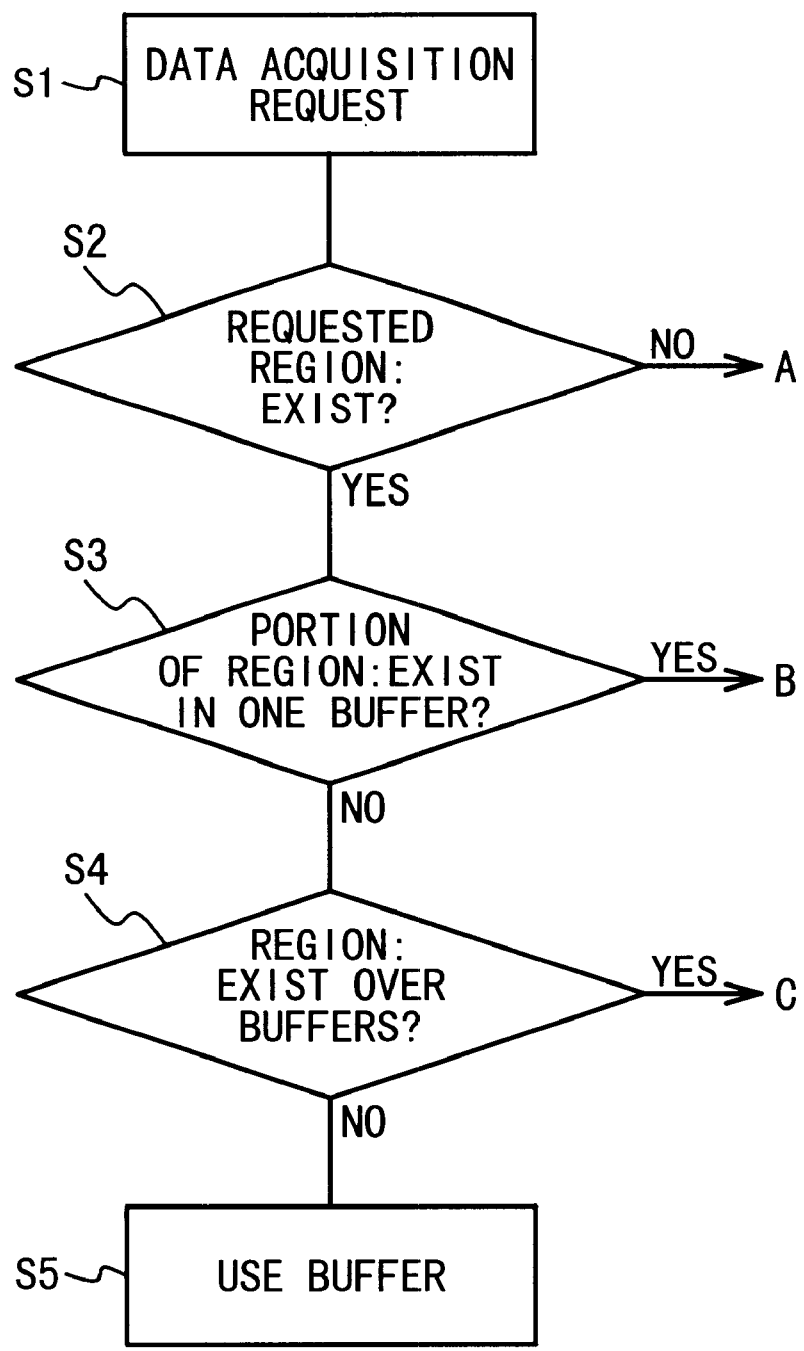
FIGS. 7 to 10 are flow charts to explain an operation of the buffer cache apparatus according to the first embodiment of the present invention.

In the flow chart of FIG. 7, when a data acquire request is issued from the CPU 16 (step S1), the request receiving unit 24 of the buffer cache apparatus 23 of FIG. 4 receives this request. The balanced tree searching unit 26 accesses the buffer cache 38 through the buffer control unit 40 in response to the data acquire request. Thus, the balanced tree searching unit 26 searches the balanced tree and determines whether or not the requested data which is indicated by the numbers of the blocks, exists in the buffers on the balanced tree (Step S2).

When the requested data exists in any of the buffers on the balanced tree, it is determined whether or not a portion of the requested data exists in a single buffer on the balanced tree (Step S3). If the portion of the requested data does not exist in the single buffer, it is next determined whether or not the requested data exists in a plurality of buffers on the balanced tree (Step S4). If the requested data does not exist in the plurality of buffers on the balanced tree, it is determined that the above-mentioned requested data exists on the balanced tree just as it is. Therefore, the existing buffer is used just as it is (Step S5). That is, the effective data is read out from the buffer. In this case, the state of the balanced tree does not change. This operation is equivalent to the above-mentioned first operation pattern.

Figure 8:
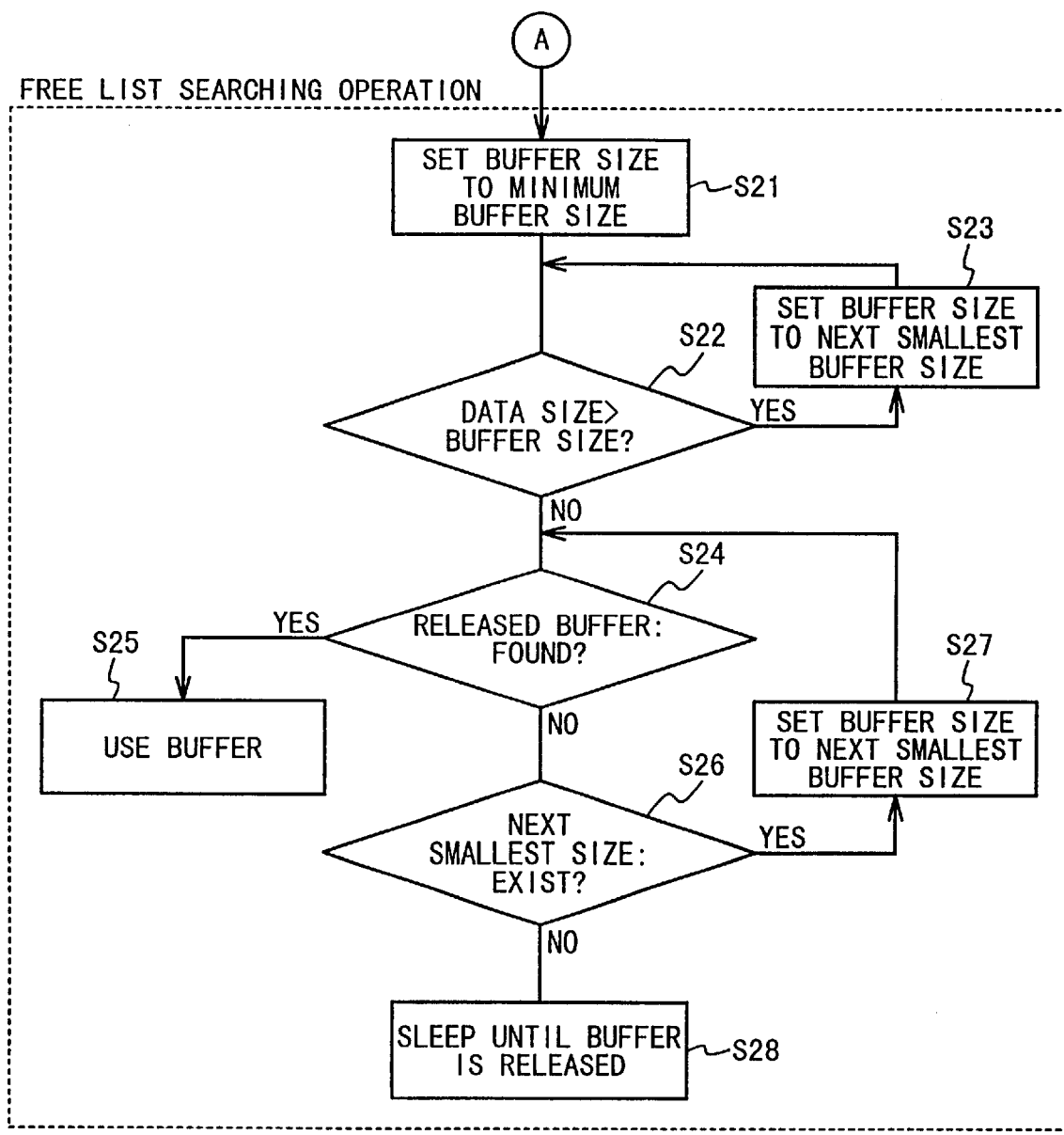

When it is determined in the step S2 that the requested data does not exist in the buffer on the balanced tree, the flow shown in FIG. 8 is executed. In this flow, the optimal buffer searching unit 30 and the released buffer searching unit 28 access the buffer cache 38 through the buffer control unit 40 to start the searching operation to the free list 46.

In the free list searching operation, the optimal buffer searching unit 30 searches the free lists 46 to determine one of the free lists 46. That is, the minimum of the buffer sizes of the free lists is set as a temporary buffer size (Step S21). Next, the optimal buffer searching unit 30 compares the size of the requested data and the temporary buffer size (Step S22). When the requested data size is larger than the temporary buffer size, the optimal buffer searching unit 30 searches the head sections of the free lists for the next smallest buffer size and sets as the temporary buffer size (step S23). Then, the step S22 is carried out again to compare the temporary buffer size with the requested data size. The above steps S22 and S23 are repeated until the free list with the buffer size larger than the requested data size is found.

When the free list with the buffer size larger than the requested data size is founded in step S22, the released buffer searching unit 28 searches the found free list to determine whether or not a released buffer is connected with the found free list. That is, the released buffer searching unit 28 determines whether or not the release buffer is found (Step S24). When the released buffer is not found out in the step S24, it is determined whether or not there is a free list for buffers with a further larger buffer size (Step S26). When there is a free list for the buffers with the further larger size, the free list is searched (step S27), and it is determined whether or not a released buffer exists in the free list (Step S24). When the released buffer is determined to exist in the free list, the buffer inserting and deleting unit 32 reserves and inserts the released buffer into the balanced tree. Then, the buffer is used to store the data on the magnetic disk in the buffer through the input and output control unit 36 (Step S25). This operation is equivalent to the above-mentioned second operation pattern. If any usable buffer is not found in the step S26, the process enters a sleep condition until any usable buffer is released (Step S28).

Figure 9:
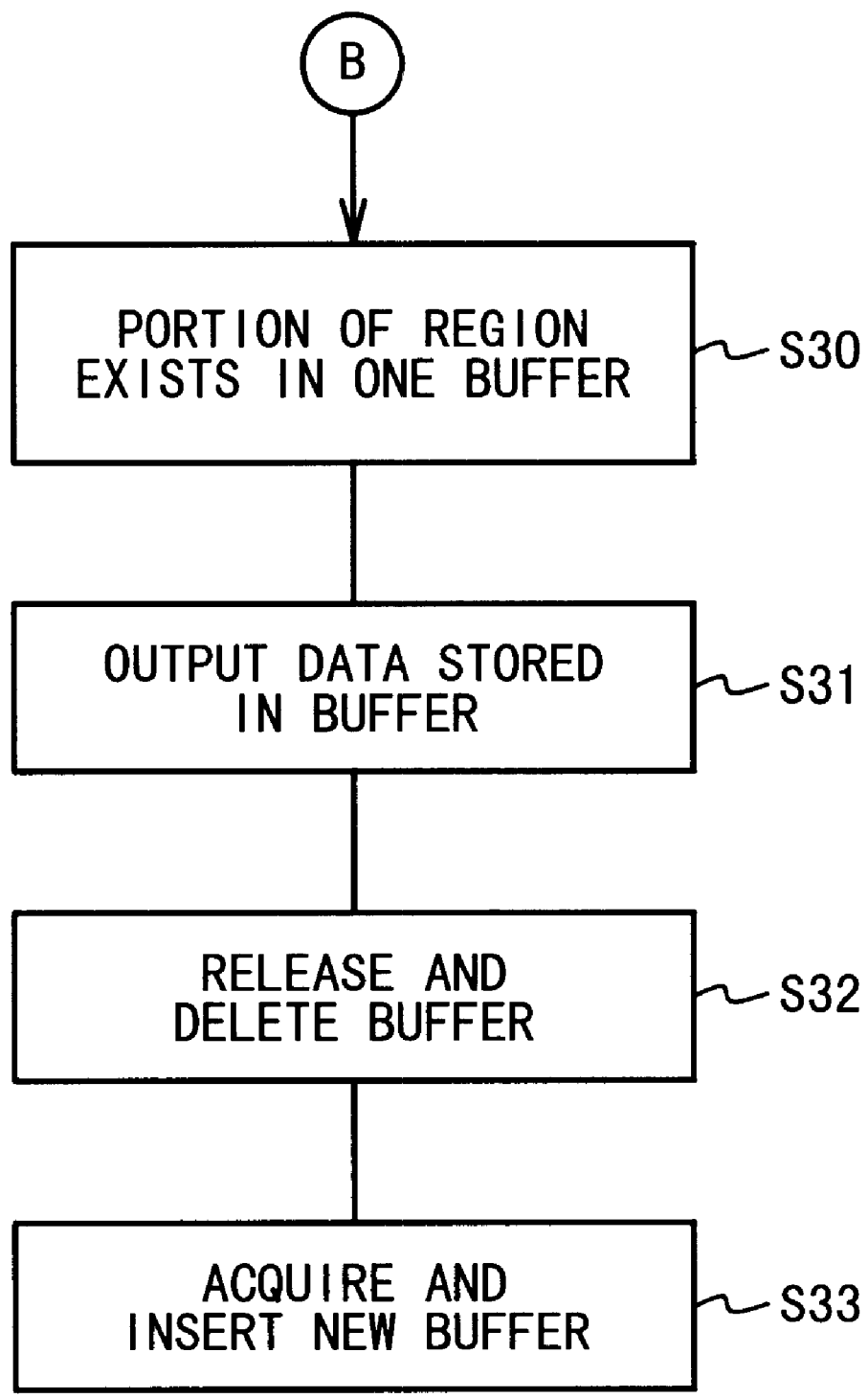

Next, when it is determined in the step S3 of FIG. 7 that a portion of the requested data exists in a buffer on the balanced tree, the flow shown in FIG. 9 is executed.

That is, the released buffer searching unit 28, the optimal buffer searching unit 30 and the buffer inserting and deleting unit 32 access the buffer cache 38 through the buffer control unit 40. At this time, the optimal buffer searching unit 30 determines one of the free lists 46 with the buffer size matching to the requested data size as described in the flow of FIG. 8. Also, the released buffer searching unit 28 searches the released buffer which is connected to the determined free list, as described in the flow of FIG. 8. Also, the buffer inserting and deleting unit 32 first writes data stored in the buffer onto the magnetic disk 18 though the input and output control unit 36 (Step S31). Then, the buffer inserting and deleting unit 32 releases and deletes the buffer from the balanced tree, and connects the buffer with one of the free lists 46 which has the same buffer size as the released buffer. Then, the buffer inserting and deleting unit 32 removes a new buffer searched by the released buffer searching unit 28 from the left end of the free list determined by the optimal buffer searching unit 30. Thus, the new buffer is reserved, and the buffer inserting and deleting unit 32 connects the new buffer to the balanced tree. That is, the new buffer is inserted into the balanced tree (Step S33). The requested data is stored in the new buffer through the input and output control unit 36. This operation is equivalent to the above-mentioned third operation pattern.

Figure 10:
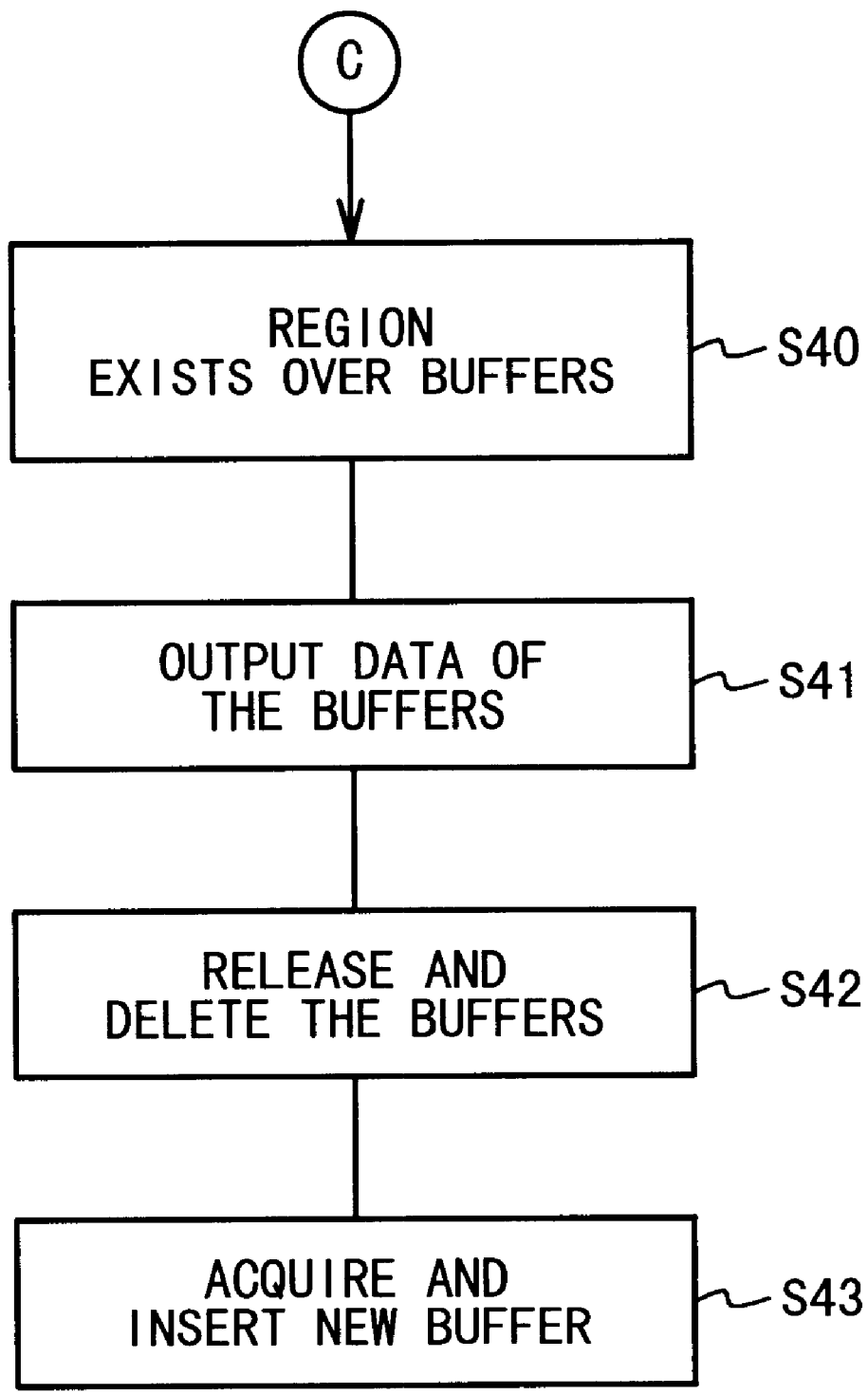

Next, when it is determined in the step S4 of FIG. 7 that the requested data exists in the plurality of buffers on the balanced tree, the flow shown in FIG. 10 is executed.

That is, the released buffer searching unit 28, the optimal buffer searching unit 30 and the buffer inserting and deleting unit 32 access the buffer cache 38 through the buffer control unit 40. At this time, the optimal buffer searching unit 30 determines one of the free lists 46 with the buffer size matching to the requested data size as described in the flow of FIG. 8. Also, the released buffer searching unit 28 searches the released buffer which is connected to the determined free list, as described in the flow of FIG. 8. Then, the buffer inserting and deleting unit 32 first stores data stored in the plurality of buffers in the magnetic disk 18 through the input and output control unit 36 (step S41). Then, the buffer inserting and deleting unit 32 releases and deletes all the plurality of buffers (Step S42). Then, the buffer inserting and deleting unit 32 removes a new buffer searched by the released buffer searching unit 28 from the left end of the free list determined by the optimal buffer searching unit 30. Then, the new buffer is reserved, and the buffer inserting and deleting unit 32 connects the new buffer to the balanced tree. That is, the new buffer is inserted into the balanced tree (Step S43). The requested data is stored in the new buffer through the input and output control unit 36. This operation is equivalent to the above-mentioned fourth operation pattern.

Next, the states of the balanced tree in the above four patterns will be described in detail. First, it is supposed that the initial state of the balanced tree 44 is the state shown in FIG. 11.

In the first operation pattern, the buffer existing on the balanced tree is used just as it is. Therefore, the state of the balanced tree does not change. However, the content of the buffer holding data is updated.

In the second operation pattern, the requested data is supposed to be in blocks 75 to 78, for example. Therefore, this data does not exist on the balanced tree of FIG. 11. For this reason, a buffer with the size larger than the requested data size and the nearest size to the requested data size is released and reserved from one of the free lists. The reserved buffer is inserted in the balanced tree, as shown in FIG. 12. At this time, the buffer control unit 40 writes the head address of the inserted buffer as a pointer in the buffer with the blocks 57 to 58.

Figure 13:
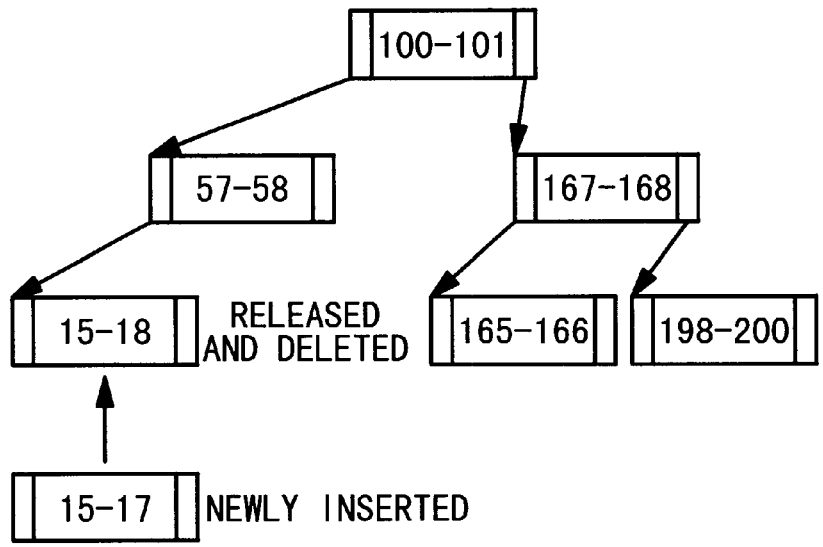
FIG. 13 is a diagram showing deletion of a buffer and insertion of a new buffer in the balanced tree.

In the third operation pattern, the requested data is supposed to be in blocks 15 to 17, for example. This requested data exists in a single buffer with the blocks 15 to 18 on the balanced tree of FIG. 11. Therefore, all the data stored in the buffer with the blocks 15 to 18 are once stored on the magnetic disk 18 and then the buffer is released and deleted from the balanced tree. Then, a new buffer with the size larger than the requested data size and the size as small as possible to the requested data size is reserved. The reserved buffer is inserted into the balanced tree, as shown in FIG. 13. Then, the data of the blocks 15 to 17 are written in the inserted buffer. In this way, another program can use the data of the block 18 which has been stored on the magnetic disk.

Figure 14:
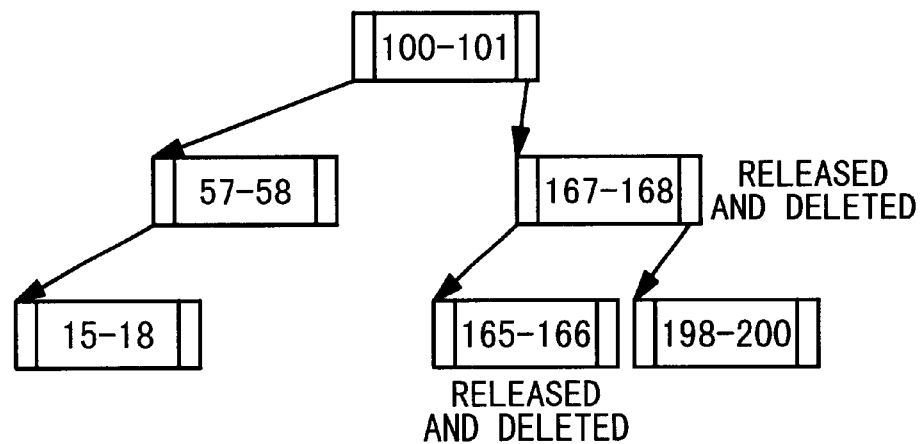
FIG. 14 is a diagram showing deletion of buffers in the balanced tree.
Figure 15:
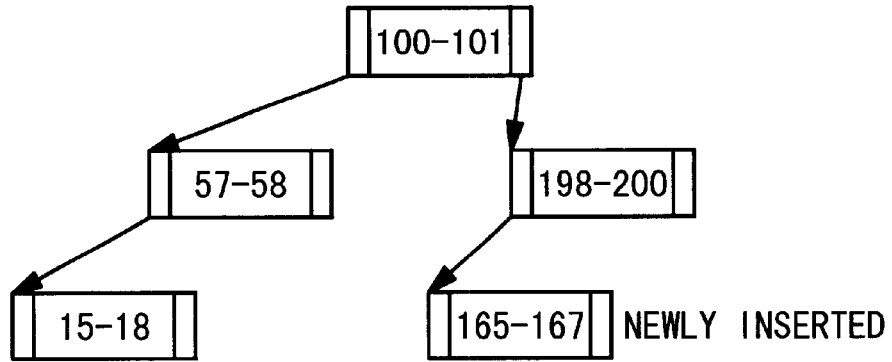
FIG. 15 is a diagram showing insertion of a new buffer in the balanced tree.

In the fourth operation pattern, the requested data is supposed to be in blocks 165 to 167, for example. This requested data exists in two of the buffers, that is the buffer with the blocks 165 and 166 and the buffer with the blocks 167 and 168 in the balanced tree of FIG. 11. Therefore, these data stored in the two buffers are stored on the magnetic disk 18, and then the two buffers are released and deleted from the balanced tree, as shown in FIG. 14. Then, a new buffer with the size larger than the requested data size and the size as smaller as possible is reserved. The reserved buffer is inserted in the balanced tree, as shown in FIG. 15. Then, the requested data is written in the buffer with the blocks 165 to 167.

Figure 11:
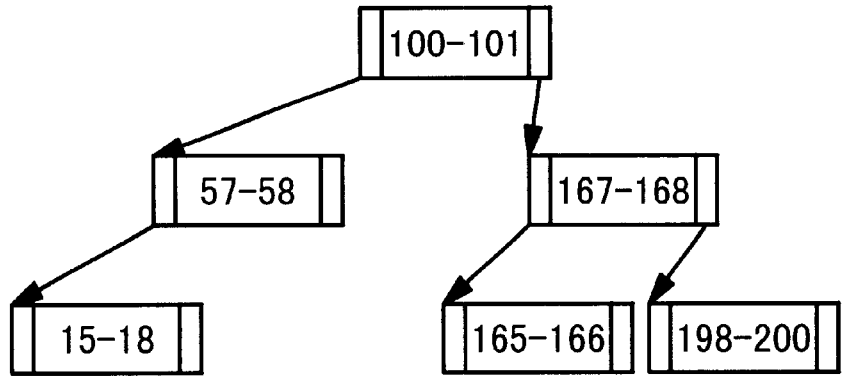
FIG. 11 is a diagram showing the initial state of a balanced tree.
Figure 12:
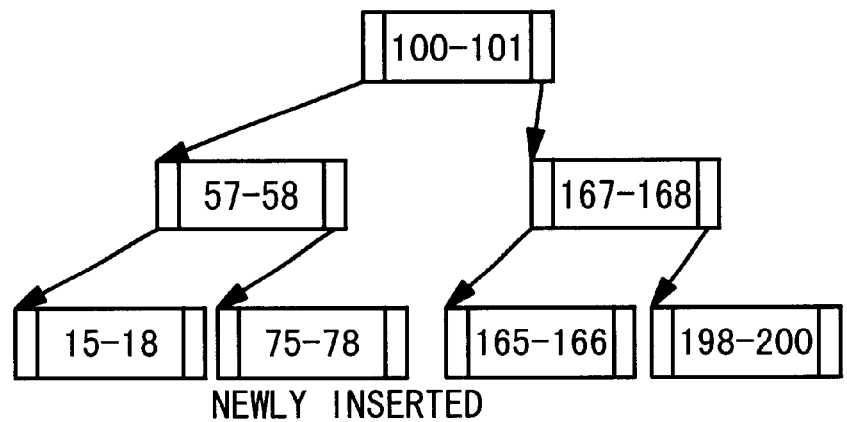
FIG. 12 is a diagram showing insertion of a buffer into the balanced tree.

Through the above processes, the two nodes must be searched in the balanced tree of FIG. 11 for the requested data of the blocks 165 to 167. However, in the balanced tree of FIG. 15, the search speed can be improved, because only one node is searched. Also, another program can use the data of the blocks 165 to 167 which have been stored on the magnetic disk 18.

As mentioned above, the insertion and the deletion of the buffers into and from the balanced tree is repeated. At this time, there is a case that the balance of the balanced tree is degraded. That is, the depth of layers from the root node to leaf nodes becomes different, i.e., is not uniform. In this case, the searching time of the search tree takes a long time when the balance of the balanced tree is degraded. For this reason, it is necessary to correct the balance of the balanced tree in the suitable timing.

Next, the correction of the balanced tree in the buffer cache apparatus according to the second embodiment of the present invention will be described below. The buffer cache apparatus according to the second embodiment of the present invention has the structure shown in FIG. 4.

Figure 16:
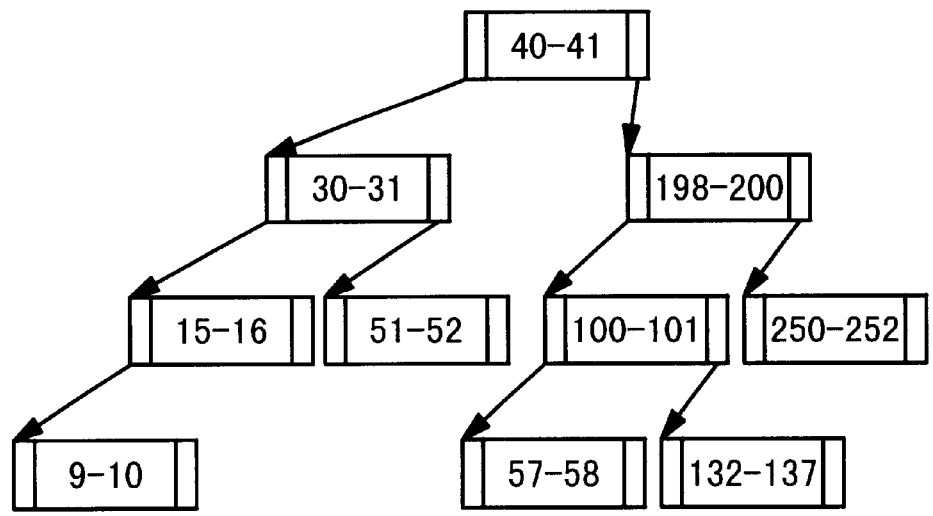
FIG. 16 is a diagram showing the initial state of a balanced tree.
Figure 17:
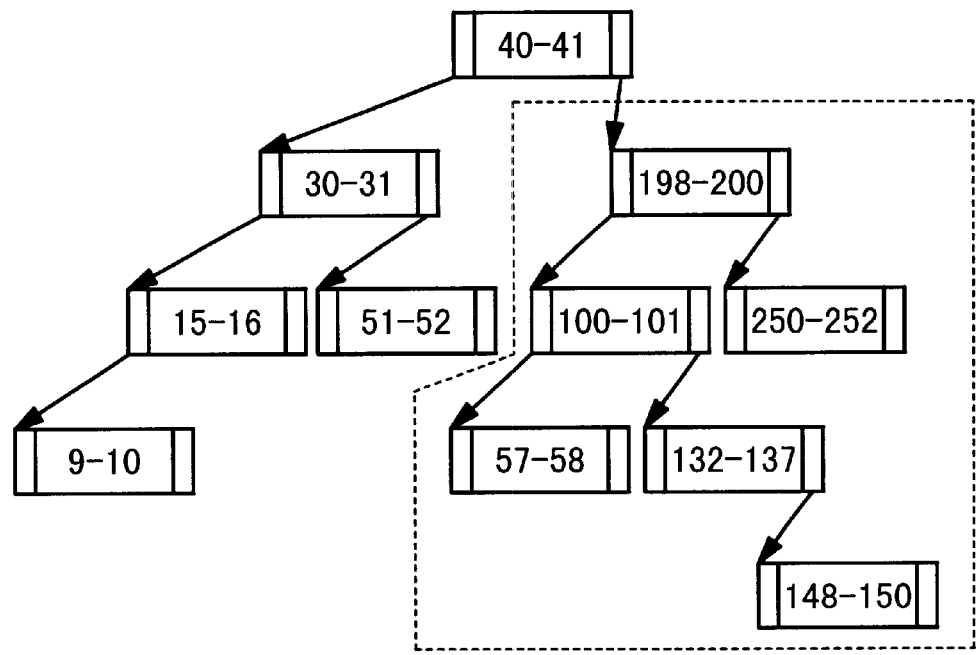
FIG. 17 is a diagram showing the unbalanced state of the balanced tree.

It is now supposed that the balanced tree is in the state shown in FIG. 16. Also, it is supposed that a new buffer with the blocks 148 to 150 is reserved and inserted in the balanced tree as shown in FIG. 17. As a result, the unbalance of the balanced tree occurs. In FIG. 17, the unbalanced tree portion is surrounded by a dotted line. The occurrence of such unbalance is not desirable, because it increases the search time of the balanced tree. Also, the unbalance of the balanced tree occurs when a buffer is deleted from the balanced tree. The correction of the unbalance of the balanced tree is carried out at the timing of either of the following two case.

(1) If the unbalance occurs on the balanced tree in case of insertion or deletion of the buffer, the balanced tree is corrected immediately to eliminate the unbalance. This correction suits when there are few correction portions.

(2) When the insertion and deletion are carried out over various portions, the correction is carried out during the idle time of the CPU 16. When the correction is carried out in the idle state of the CPU, whether the whole correction or partial correction is carried out is appropriately selected based on the length of the idle time of the CPU 16.

Figure 18:
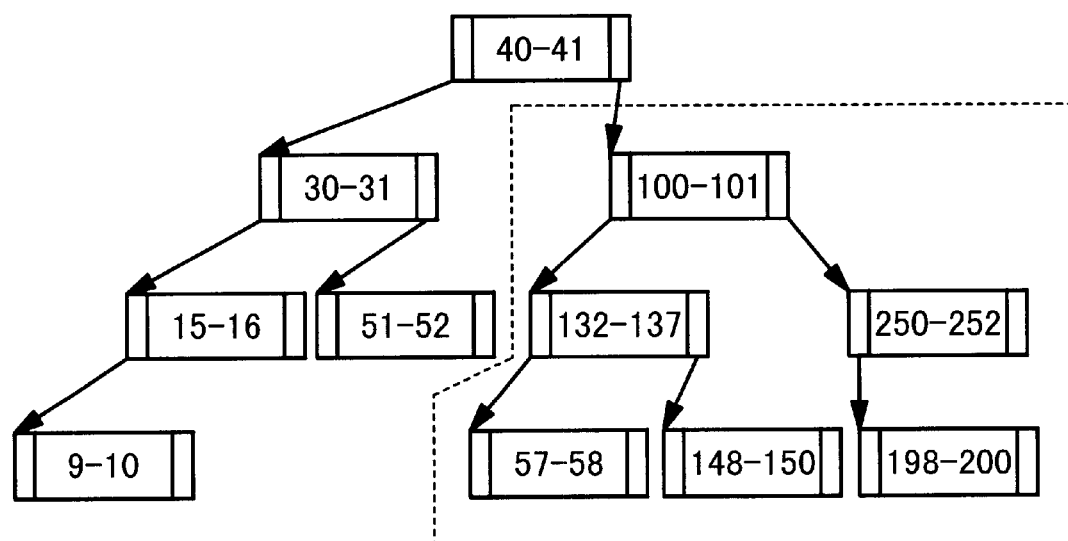
FIG. 18 is a diagram showing correction of the balanced tree.

The correction is carried out as follows. First, the balanced tree searching unit 26 searches the unbalanced portions. Then, the balanced tree correcting unit 34 changes the pointers of the buffers such that the depth or number of layers from the root node to leaf nodes becomes as uniform as possible. For example, the buffer with the blocks 40 and 41 has the pointer for pointing to the buffer with the blocks 198 to 200. Therefore, the pointer is changed to point to the buffer with the blocks 100 and 101. FIG. 18 shows the balanced tree after the correction is carried out to the unbalanced tree of FIG. 17 to eliminate the unbalance. The number of layers from the buffer with the blocks 40 and 41 to the buffer with the blocks 9 and 10 is 4. Also, the number of layers from the buffer with the blocks 40 and 41. to the buffer with the blocks 57 and 58 is 4. Thus, the depth of the layers becomes uniform to eliminate the unbalance.

As described above, according to the present invention, the buffer cache can be made variable in length and the balanced tree is adopted. Therefore, the data with various sizes can be accessed at high speed.

What is claimed is:

1. A buffer cache apparatus comprising:

a storage unit storing data;

a buffer cache storing a balanced binary tree and free lists, wherein buffers containing data are hierarchically provided as nodes in said balanced binary tree, and said free lists are respectively provided for different sizes, each of said free lists including at least one free buffer when said at least one free buffer exists; and a control unit responsive to a data request, wherein said control unit searches said free lists for a desired buffer based on a size of a requested data requested by said data request, when said requested data does not exist in said balanced binary tree, and adds said desired buffer to said balanced binary tree to store said requested data from said storage unit into said desired buffer, wherein said desired buffer is the smallest buffer in said free lists having a size larger than or equal to said requested data size.

2. A buffer cache apparatus according to claim 1, wherein said buffer cache apparatus is applied to a switching apparatus.

3. A buffer cache apparatus comprising:

a storage unit storing data;

a buffer cache storing a balanced tree and free lists, wherein buffers containing data are hierarchically provided as nodes in said balanced tree, and said free lists are respectively provided for different sizes, each of said free lists including at least one free buffer when said at least one free buffer exists; and a control unit responsive to a data request, wherein said control unit searches said free lists for a desired buffer based on a size of a requested data requested by said data request, when said requested data does not exist in said balanced tree, and adds said desired buffer to said balanced tree to store said requested data from said storage unit into said desired buffer, wherein said desired buffer is the smallest buffer in said free lists having a size larger than or equal to said requested data size;

wherein each of said free lists comprises a head section indicating said size and said at least one free buffer connected to said head section, when said at least one free buffer exists, and wherein said control unit:
(a) searches said head sections of said free lists based on said requested data size to find one of said free lists which is provided for the smallest one of said sizes larger than said requested data size,
(b) determines whether said found free list contains said at least one free buffer,
(c) sets another of said free lists for the next smallest size as said found free list, when it is determined that said found free list does not contain said at least one free buffer, and
(d) sets as said desired buffer, a free buffer contained in said found free list, when it is determined that said found free list contains said at least one free buffer, from the searching operation or repetition of the setting operation.

4. A buffer cache apparatus comprising:

a storage unit storing data;

a buffer cache storing a balanced tree and free lists, wherein buffers containing data are hierarchically provided as nodes in said balanced tree, and said free lists are respectively provided for different sizes, each of said free lists including at least one free buffer when said at least one free buffer exists; and a control unit responsive to a data request, wherein said control unit searches said free lists for a desired buffer based on a size of a requested data requested by said data request, when said requested data does not exist in said balanced tree, and adds said desired buffer to said balanced tree to store said requested data from said storage unit into said desired buffer, wherein said desired buffer is the smallest buffer in said free lists having a size larger than or equal to said requested data size, and wherein said control unit releases and deletes one of said data containing buffers from said balanced tree, when at least a part of said requested data exists in said data containing buffer of said balanced tree, and searches said free lists for said desired buffer based on said requested data size.

5. A buffer cache apparatus according to claim 4, wherein said control unit adds said deleted data containing buffer as said free buffer to one of said free lists based on a size of said deleted data containing buffer.

6. A buffer cache apparatus according to claim 4, wherein said control unit searches said desired buffer from said free lists based on said requested data size, said sizes for said free lists, and whether said at least one free buffer is connected to each of said free lists.

7. A buffer cache apparatus comprising:

a storage unit storing data;

a buffer cache storing a balanced tree and free lists, wherein buffers containing data are hierarchically provided as nodes in said balanced tree, and said free lists are respectively provided for different sizes, each of said free lists including at least one free buffer when said at least one free buffer exists; and a control unit responsive to a data request, wherein said control unit searches said free lists for a desired buffer based on a size of a requested data requested by said data request, when said requested data does not exist in said balanced tree, and adds said desired buffer to said balanced tree to store said requested data from said storage unit into said desired buffer, wherein said desired buffer is the smallest buffer in said free lists having a size larger than or equal to said requested data size, and wherein said control unit releases and deletes ones of said data containing buffers from said balanced tree, when at least a part of said requested data exists in said data containing buffers of said balanced tree, and searches said free lists for said desired buffer based on said requested data size.

8. A buffer cache apparatus according to claim 7, wherein said control unit adds said deleted data containing buffers as said free buffers to said free lists based on a size of each of said deleted data containing buffers.

9. A buffer cache apparatus according to claim 7, wherein said control unit searches said desired buffer from said free lists based on said requested data size, said sizes for said free lists, and whether said at least one free buffer is connected to each of said free lists.

10. A buffer cache apparatus comprising:

a storage unit storing data;

a buffer cache storing a balanced tree and free lists, wherein buffers containing data are hierarchically provided as nodes in said balanced tree, and said free lists are respectively provided for different sizes, each of said free lists including at least one free buffer when said at least one free buffer exists; and a control unit responsive to a data request, wherein said control unit searches said free lists for a desired buffer based on a size of a requested data requested by said data request, when said requested data does not exist in said balanced tree, and adds said desired buffer to said balanced tree to store said requested data from said storage unit into said desired buffer, wherein said desired buffer is the smallest buffer in said free lists having a size larger than or equal to said requested data size, and wherein said control unit corrects said balanced tree such that depths from a root node to leaf nodes in said nodes of the balanced tree are as uniform as possible.

11. A buffer cache apparatus according to claim 10, wherein said control unit carries out said correcting operation at a predetermined time or an idle time of said control unit.

12. A buffer caching method comprising:
determining whether a requested data specified by a data request exists in a balanced binary tree, wherein buffers are hierarchically provided as nodes in said balanced binary tree;
searching a desired buffer from free buffers with different sizes based on a size of said requested data when it is determined that said requested data does not exist in said balanced binary tree, said desired buffer is the smallest free buffer having a size larger than or equal to said requested data size;
adding said desired buffer to said balanced binary tree; and
storing said requested data from said storage unit into said desired buffer.

13. A buffer caching method comprising:
determining whether a requested data specified by a data request exists in a balanced tree, wherein buffers are hierarchically provided as nodes in said balanced tree;
searching a desired buffer from free buffers with different sizes based on a size of said requested data when it is determined that said requested data does not exist in said balanced tree, said desired buffer is the smallest free buffer having a size larger than or equal to said requested data size;
adding said desired buffer to said balanced tree; and
storing said requested data from said storage unit into said desired buffer,
wherein said searching includes:
(a) finding one of a plurality of free lists based on said requested data size, wherein said found free list is provided for the smallest one of said sizes larger than said requested data size;
(b) determining whether said found free list contains said at least one free buffer;
(c) setting another of said free lists for the next smallest size as said found free list, when it is determined that said found free list does not contain said at least one free buffer; and
(d) setting as said desired buffer, a free buffer contained in said found free list, when it is determined that said found free list contains said at least one free buffer, after the finding operation (a) or repetition of the setting operation (c).

14. A buffer caching method comprising:
determining whether a requested data specified by a data request exists in a balanced tree, wherein buffers are hierarchically provided as nodes in said balanced tree;
searching a desired buffer from free buffers with different sizes based on a size of said requested data when it is determined that said requested data does not exist in said balanced tree, said desired buffer is the smallest free buffer having a size larger than or equal to said requested data size;
adding said desired buffer to said balanced tree;
storing said requested data from said storage unit into said desired buffer;
releasing and deleting one of said data containing buffers from said balanced tree, when said requested data exists in said data containing buffers of said balanced tree; and
searching free lists for said desired buffer based on said requested data size.

15. A buffer caching method according to claim 14, further comprising:
adding said deleted data containing buffer as said free buffer to one of said free lists based on a size of said deleted data containing buffer.

16. A buffer caching method according to claim 14, further comprising:
searching said desired buffer from said free lists based on said requested data size, said sizes for said free lists, and whether said at least one free buffer is connected to each of said free lists.

17. A buffer caching method comprising:
determining whether a requested data specified by a data request exists in a balanced tree, wherein buffers are hierarchically provided as nodes in said balanced tree;
searching a desired buffer from free buffers with different sizes based on a size of said requested data when it is determined that said requested data does not exist in said balanced tree, said desired buffer is the smallest free buffer having a size larger than or equal to said requested data size;
adding said desired buffer to said balanced tree;
storing said requested data from said storage unit into said desired buffer;
releasing and deleting data containing buffers from said balanced tree, when said requested data exists in said data containing buffers of said balanced tree; and
searching free lists for said desired buffer based on said requested data size.

18. A buffer caching method according to claim 17, further comprising:
adding said deleted data containing buffers as said free buffers to said free lists based on a size of each of said deleted data containing buffers.

19. A buffer caching method according to claim 17, further comprising:
searching said desired buffer from said free lists based on said requested data size, said sizes for said free lists, and whether said at least one free buffer is connected to each of said free lists.

20. A buffer caching method comprising:
determining whether a requested data specified by a data request exists in a balanced tree, wherein buffers are hierarchically provided as nodes in said balanced tree;
searching a desired buffer from free buffers with different sizes based on a size of said requested data when it is determined that said requested data does not exist in said balanced tree, said desired buffer is the smallest free buffer having a size larger than or equal to said requested data size;
adding said desired buffer to said balanced tree;
storing said requested data from said storage unit into said desired buffer; and
correcting said balanced tree such that depths from a root node to leaf nodes in said nodes of the balanced tree are as uniform as possible.

21. A buffer caching method according to claim 20, wherein said correcting operation is carried out at a predetermined time or an idle time of said control unit.

22. A recording medium storing a program for executing a buffer caching method which comprises:
determining whether a requested data specified by a data request exists in a balanced binary tree, wherein buffers are hierarchically provided as nodes in said balanced binary tree;

searching a desired buffer from free buffers with different sizes based on a size of said requested data when it is determined that said requested data does not exist in said balanced binary tree, said desired buffer is the smallest free buffer having a size larger than or equal to said requested data size;

adding said desired buffer to said balanced binary tree; and storing said requested data from said storage unit into said desired buffer.

23. A recording medium storing a program for executing a buffer caching method which comprises:

determining whether a requested data specified by a data request exists in a balanced tree, wherein buffers are hierarchically provided as nodes in said balanced tree;

searching a desired buffer from free buffers with different sizes based on a size of said requested data when it is determined that said requested data does not exist in said balanced tree, said desired buffer is the smallest free buffer having a size larger than or equal to said requested data size;

adding said desired buffer to said balanced tree; and storing said requested data from said storage unit into said desired buffer;

wherein said searching includes:
(a) finding one of plurality of free lists based on said requested data size, wherein said found free list is provided for the smallest one of said sizes larger than said requested data size;
(b) determining whether said found free list contains said at least one free buffer;
(c) setting another of said free lists for the next smallest size as said found free list, when it is determined that said found free list does not contain said at least one free buffer; and
(d) setting as said desired buffer, a free buffer contained in said found free list when, it is determined that said found free list contains said at least one free buffer, after the finding operation (a) or repetition of the setting operation (c).

24. A recording medium storing a program for executing a buffer caching method which comprises:

determining whether a requested data specified by a data request exists in a balanced tree, wherein buffers are hierarchically provided as nodes in said balanced tree;

searching a desired buffer from free buffers with different sizes based on a size of said requested data when it is determined that said requested data does not exist in said balanced tree, said desired buffer is the smallest free buffer having a size larger than or equal to said requested data size;

adding said desired buffer to said balanced tree;

storing said requested data from said storage unit into said desired buffer;

releasing and deleting one of said data containing buffers from said balanced tree, when said requested data exists in said data containing buffers of said balanced tree; and searching free lists for said desired buffer based on said requested data size.

25. A recording medium according to claim 24, wherein said method further comprises:

adding said deleted data containing buffer as said free buffer to one of said free lists based on a size of said deleted data containing buffer.

26. A recording medium according to claim 24, wherein said method further comprises:

searching said desired buffer from said free lists based on said requested data size, said sizes for said free lists, and whether said at least one free buffer is connected to each of said free lists.

27. A recording medium storing a program for executing a buffer caching method which comprises:

determining whether a requested data specified by a data request exists in a balanced tree, wherein buffers are hierarchically provided as nodes in said balanced tree;

searching a desired buffer from free buffers with different sizes based on a size of said requested data when it is determined that said requested data does not exist in said balanced tree, said desired buffer is the smallest free buffer having a size larger than or equal to said requested data size;

adding said desired buffer to said balanced tree;

storing said requested data from said storage unit into said desired buffer;

releasing and deleting data containing buffers from said balanced tree, when said requested data exists in said data containing buffers of said balanced tree; and searching free lists for said desired buffer based on said requested data size.

28. A recording medium according to claim 27, wherein said method further comprises:

adding said deleted data containing buffers as said free buffers to said free lists based on a size of each of said deleted data containing buffers.

29. A recording medium according to claim 27, wherein said method further comprises:

searching said desired buffer from said free lists based on said requested data size, said sizes for said free lists, and whether said at least one free buffer is connected to each of said free lists.

30. A recording medium storing a program for executing a buffer caching method which comprises:

determining whether a requested data specified by a data request exists in a balanced tree, wherein buffers are hierarchically provided as nodes in said balanced tree;

searching a desired buffer from free buffers with different sizes based on a size of said requested data when it is determined that said requested data does not exist in said balanced tree, said desired buffer is the smallest free buffer having a size larger than or equal to said requested data size;

adding said desired buffer to said balanced tree;

storing said requested data from said storage unit into said desired buffer; and correcting said balanced tree such that depths from a root node to leaf nodes in said nodes of the balanced tree are as uniform as possible.

31. A recording medium according to claim 30, wherein said correcting operation is carried out at a predetermined time or an idle time of said control unit.

* * * * *